United States Patent
Kumar et al.

(10) Patent No.: US 11,861,308 B2
(45) Date of Patent: Jan. 2, 2024

(54) MAPPING NATURAL LANGUAGE UTTERANCES TO OPERATIONS OVER A KNOWLEDGE GRAPH

(71) Applicant: INTUIT INC., Mountain View, CA (US)

(72) Inventors: Sricharan Kallur Palli Kumar, Mountain View, CA (US); Cynthia Joann Osmon, Sunnyvale, CA (US); Conrad De Peuter, Mountain View, CA (US); Roger C. Meike, Redwood City, CA (US); Gregory Kenneth Coulombe, Sherwood Park (CA); Pavlo Malynin, Menlo Park, CA (US)

(73) Assignee: INTUIT INC., Mountain View, CA (US)

( * ) Notice: Subject to any disclaimer, the term of this patent is extended or adjusted under 35 U.S.C. 154(b) by 360 days.

(21) Appl. No.: 16/849,797

(22) Filed: Apr. 15, 2020

(65) Prior Publication Data

US 2021/0326531 A1 Oct. 21, 2021

(51) Int. Cl.
*G06F 40/279* (2020.01)
*G06N 20/00* (2019.01)
(Continued)

(52) U.S. Cl.
CPC ............ *G06F 40/279* (2020.01); *G06F 16/24* (2019.01); *G06N 5/02* (2013.01); *G06N 20/00* (2019.01)

(58) Field of Classification Search
None
See application file for complete search history.

(56) References Cited

U.S. PATENT DOCUMENTS

2015/0363390 A1 12/2015 Mungi et al.
2018/0150522 A1* 5/2018 Moskwinski ........... G06F 16/00
(Continued)

FOREIGN PATENT DOCUMENTS

| KR | 101986721 B1 | 6/2019 |
| WO | 2013013173 A2 | 1/2013 |
| WO | 2018031656 A1 | 2/2018 |

OTHER PUBLICATIONS

PCT/US2020/033085, International Search Report and Written Opinion dated Nov. 25, 2020, 15 pages.
(Continued)

*Primary Examiner* — Antim G Shah
(74) *Attorney, Agent, or Firm* — Patterson + Sheridan, LLP (57) ABSTRACT

Certain aspects of the present disclosure provide techniques for processing natural language utterances in a knowledge graph. An example method generally includes receiving a long-tail query comprising a natural language utterance from a user of an application. Operands and operators are extracted from the natural language utterance using a natural language model. Operands may be mapped to nodes in a knowledge graph, the nodes representing values calculated from data input into the application, and operators may be mapped to operations to be performed on data extracted from the knowledge graph. The functions associated with the operators are executed using data extracted from the nodes in the knowledge graph associated with the operands to generate a query result. The query result is returned as a response to the received long-tail query.

19 Claims, 6 Drawing Sheets

(51) Int. Cl.
  *G06F 16/24*     (2019.01)
  *G06N 5/02*      (2023.01)

(56) References Cited

U.S. PATENT DOCUMENTS

| | | | |
|---|---|---|---|
| 2018/0181613 A1* | 6/2018 | Acharya | G06F 16/243 |
| 2018/0213062 A1* | 7/2018 | Muthyala | H04L 67/306 |
| 2019/0074006 A1* | 3/2019 | Kumar | G10L 15/30 |
| 2020/0311134 A1* | 10/2020 | Reddy | G06N 5/022 |
| 2020/0401590 A1* | 12/2020 | Staar | G06F 16/24522 |
| 2021/0073474 A1* | 3/2021 | Sengupta | G06F 40/216 |
| 2021/0109995 A1* | 4/2021 | Mihindukulasooriya | G06F 40/268 |
| 2021/0264296 A1* | 8/2021 | Martelaro | G06N 5/022 |

OTHER PUBLICATIONS

Yan Wang et al., Deep Neural Solver for Math Word Problems, Proceeding of the 2017 Conference on Empirical Methods in Natural Language Processing, 2017, 10 pages.

Dakshi T.K. Geeganage et al., "Sentence Based Mathematical Problem Solving Approach Via Ontology Modeling," 2016 6th International Conference on IT Convergence and Security (ICITCS), IEEE, Sep. 26, 2016, 6 pages.

Dongxiang Zhang, et al., "The Gap of Semantic Parsing: A Survey on Automatic Math Word Problem Solvers," arxiv.org, Cornell University Library, Aug. 22, 2018, 17 pages.

* cited by examiner

What is your question? ╭─202

What percent of my income is wage income and what percent of my income is investment income?

The answer to your question: ╭─204

You had total income of $56,789 last year
90 percent of your income was wage income
10 percent of your income was investment income

MAPPING NATURAL LANGUAGE UTTERANCES TO OPERATIONS OVER A KNOWLEDGE GRAPH

INTRODUCTION

Aspects of the present disclosure relate to processing natural language commands, and more specifically to performing operations extracted from a natural language command on data from a knowledge graph.

BACKGROUND

Conversational user interfaces generally provide mechanisms by which automated agents can provide answers to user-provided questions. These automated agents may be trained using various models to match user-provided questions to appropriate answers to these questions. For commonly encountered questions (e.g., questions that many users pose to automated agents for resolution), the models generally return relevant answers that are relevant to a user's query. However, for less commonly encountered questions, or "long-tail" questions, the models used by automated agents may not be able to identify a relevant solution to the question. The automated agents may return, a list of suggested articles to a user in response to a "long-tail" question rather than an answer to the question.

Accordingly, techniques are needed to allow for conversational user interfaces to generate answers to "long-tail" questions against a knowledge graph.

BRIEF SUMMARY

Certain embodiments provide a computer-implemented method for processing natural language queries in a knowledge graph. The method generally includes receiving a long-tail query comprising a natural language utterance from a user of an application. Operands and operators are extracted from the natural language utterance using a natural language model. Operands may be mapped to nodes in a knowledge graph, the nodes representing values calculated from data input into the application, and operators may be mapped to operations to be performed on data extracted from the knowledge graph. The functions associated with the operators are executed using data extracted from the nodes in the knowledge graph associated with the operands to generate a query result. The query result is returned as a response to the received long-tail query.

Other embodiments provide a system comprising a processor and a non-transitory computer-readable memory storing instructions that, when executed by the processor, perform an operation for processing natural language queries in a knowledge graph. The operation generally includes receiving a long-tail query comprising a natural language utterance from a user of an application. Operands and operators are extracted from the natural language utterance using a natural language model. Operands may be mapped to nodes in a knowledge graph, the nodes representing values calculated from data input into the application, and operators may be mapped to operations to be performed on data extracted from the knowledge graph. The functions associated with the operators are executed using data extracted from the nodes in the knowledge graph associated with the operands to generate a query result. The query result is returned as a response to the received long-tail query.

Still further embodiments provide a computer-implemented method for processing natural language queries in a knowledge graph. The method generally includes receiving a natural language utterance from a user of an application. An intent is extracted from the natural language utterance, and it is determined that no match exists between the extracted intent and nodes in a knowledge graph. Based on determining that no match exists between the extracted intent and the nodes in the knowledge graph, operands and operators are extracted from the natural language utterance using a natural language model. Operands may be mapped to nodes in a knowledge graph, the nodes representing values calculated from data input into the application, and operators may be mapped to operations to be performed on data extracted from the knowledge graph. The functions associated with the operators are executed using data extracted from the nodes in the knowledge graph associated with the operands to generate a query result. The query result is returned as a response to the received long-tail query.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Graph structures generally represent relationships between data and operations as connections between nodes in a graph, where the nodes represent data provided by a user of an application and/or operations performed by an application. These graph structures may be established as directed graphs, in which nodes representing inputs to a given node are connected to the given node using directional constructs, such as unidirectional arrows or connections that point from a source node to the given node. Because graphs can be used to define input and output relationships for a function in an application, graphs may be a useful mechanism by which an application can be defined.

In some cases, an application may be defined using a knowledge graph structure. In a knowledge graph structure, nodes in the knowledge graph may encode various rules for performing an operation. For example, a node may include rules that define required and optional inputs for a function and specify the output generated based on the required and optional inputs. Further, in the knowledge graph, nodes may be connected in a continuous path from a root node, which may represent the entry point into an operation or a series of related operations in an application, to a terminating node representing the final actions to be performed for and the results generated from executing the operation or series of related operations.

For example, in an accounting application, a knowledge graph may define an operation for tracking accounts payable as a series of connected nodes encoding rules that, when executed, results in a summation of amounts in unpaid invoices received during a given time period. In another example, in a time tracking application, a knowledge graph may define an operation for tracking overtime for any given week as a series of connected nodes encoding rules that, when executed, results in a summation of hours worked for each day of a week, less an amount of time expected to be worked during that week. Because knowledge graphs describe operations in terms of inputs and rules applied to those inputs (and any intermediate calculations) to generate a result, knowledge graphs may be used in various applications to allow users to request the result of an operation, given some set of inputs.

Conversational user interfaces allow users to pose questions against a knowledge graph using natural language inputs. A conversational agent in a conversational user interface may use a natural language understanding model to answer received natural language questions. The natural language understanding model may be trained using a training data set of utterances to map words in various natural language utterances to various nodes in the knowledge graph. For example, the natural language understanding model can be trained using a corpus of questions commonly posed by users of a software application and information about the content associated with nodes in a knowledge graph to map various keywords in natural language utterances to the appropriate nodes in the knowledge graph.

Some questions received from a user of a software application may not be mapped by a natural language understanding model to specific nodes in the knowledge graph. These questions may be, for example, questions that are asked infrequently ("long-tail" queries), questions that involve performing operations using data from multiple nodes in the knowledge graph, and the like. When conversational agents encounter such questions and determine that the natural language understanding model is unable to handle such questions (e.g., provide an answer to such a question), conversational agents may revert to other techniques for providing information to a user in response to such questions. For example, a conversational agent can use keyword searches to search a help repository and identify articles in the help repository that are potentially relevant to a received question. However, generating lists of potentially relevant articles by searching a help repository may not provide a satisfactory answer to a user's query.

Aspects of the present disclosure provide techniques for processing "long-tail" queries by extracting operators and operands from a received natural language utterance and generating a result of such queries using the extracted operators and operands. By extracting operators and operands from a received natural language utterance using machine learning models trained to identify words in the received natural language utterance that are mapped to operations and nodes in the knowledge graph, respectively, various operations may be performed against data in the knowledge graph based on the extracted operators and operands. These machine learning models may be used to augment machine learning models trained to match an intent of a query to nodes in a knowledge graph in order to generate usable answers to received queries instead of suggested articles or other information that may be tangentially related to a received query or otherwise not provide a satisfactory answer to the received query. Beneficially, then, for queries that are frequently encountered and for which a machine learning model is able to identify a matching intent, these queries may be answered using mappings learned between intents and nodes in a knowledge graph. Further, for "long-tail" queries that are infrequently encountered, an answer can be generated based on nodes in the knowledge graph rather than a list of suggested articles or other information that may be generated by a machine learning model trained to answer queries based on mappings learned between intents and nodes in a knowledge graph. Nodes need not be defined in the knowledge graph to satisfy "long-tail" queries, as these queries can be satisfied using information extracted from the knowledge graph by a machine learning model trained to match words in an utterance to nodes containing relevant data in the knowledge graph and operations associated with the operators extracted from the received natural language utterance by a machine learning model trained to match words in an utterance with an operation to be performed.

By processing queries in natural language utterances using extracted operands and operators, conversational user interfaces may be made highly scalable. For example, in intent-based systems, nodes may need to be manually defined (e.g., in a 1-to-1 mapping of intent to knowledge graph node) for each specific operation or question that may be posed through a conversational user interface, which is not scalable, as different questions may be posed by different users to a conversational user interface and an exhaustive list of these questions (and the appropriate mappings to nodes in the knowledge graph) may be difficult to maintain. With 1-to-1 mappings of intents or utterances to specific operations over specific inputs, the number of combinatorial mappings may be impracticably large, making answering questions in a conversational user interface an intractable problem in practice. Further, questions of varying degrees of complexity may be answered with a result derived from user-provided data in a knowledge graph rather than a list of articles that may not be relevant to the question posed by a user and may not use data already provided by the user to the knowledge graph.

Figure 1:
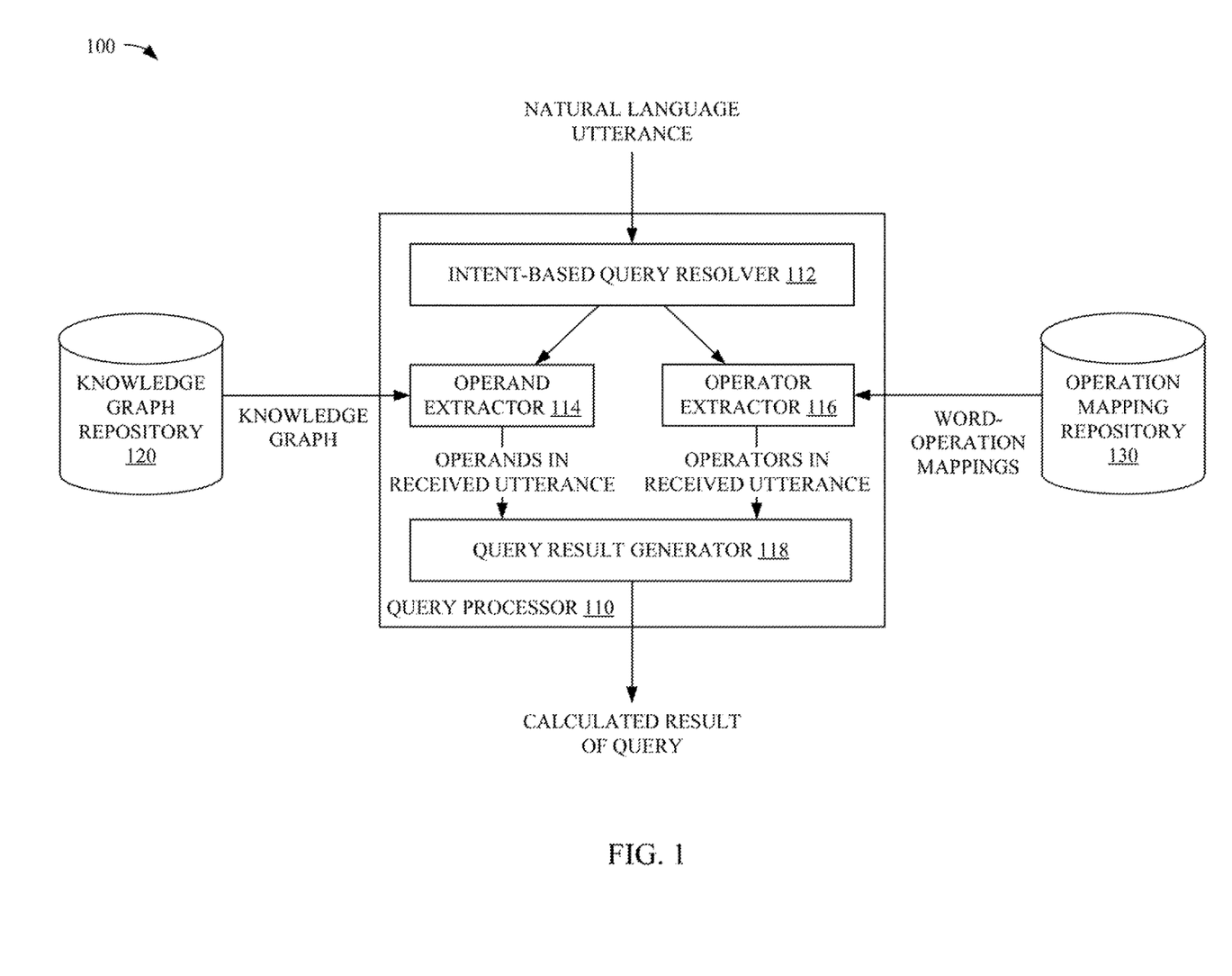
FIG. 1 depicts an example computing environment in which a natural language utterance including a question against a knowledge graph is processed by extracting operators and operands from the natural language utterance.

Example Mapping of Natural Language Utterances to Operators and Operands in a Knowledge Graph for Answering a Query FIG. 1 illustrates an example computing environment 100 in which a conversational user interface in a query processor extracts operators and operands from a natural language utterance to answer a query. As illustrated, computing environment 100 includes a query processor 110, a knowledge graph repository 120, and an operation mapping repository 130.

Query processor 110 generally exposes a conversational user interface through which a query including a natural language utterance is received for processing. The natural language utterance may be received as a text string or as an audio file from which a text string can be extracted. The natural language utterance may be received, for example, from an application executing on a client device (e.g., a desktop computer, laptop computer, smartphone, tablet computer, etc.) or from an application instance executing on a server or cluster of servers. Generally, the natural language utterance includes a query about an operation performed by an application associated with query processor 110 or data generated by the application.

To satisfy the query, query processor 110 can initially process the natural language utterance through an intent-based query resolver 112. Intent-based query resolver 112 generally uses a natural language understanding model trained against a knowledge graph (e.g., a knowledge graph stored in knowledge graph repository 120) to determine whether the query can be satisfied by retrieving data from a node in the knowledge graph. To do so, intent-based query resolver 112 can extract information from the natural language utterance, such as an intent of the natural language utterance, and attempt to match the extracted information to one or more nodes in the knowledge graph. The intent of the natural language utterance may be extracted based on a machine learning model that has been trained to recognize mappings between the meaning of a natural language utterance (e.g., the specific actions that a user has requested to be performed and/or the specific data that the user has requested to be retrieved) and specific nodes in a knowledge graph representing data that has been input into the knowledge graph or the results of calculations performed based on the data input into the knowledge graph. This machine learning model may be a natural language understanding model trained to extract information from a natural language utterance and match the extracted information to nodes in the knowledge graph. For example, to extract an intent, the machine learning model used by intent-based query resolver 112 can use techniques such as part-of-speech tagging to identify entities in the natural language utterance and match the extracted entities to entities specified as answerable by nodes in the knowledge graph. The machine learning model can identify these entities based, for example, on word matching techniques, generating embedding values for each word relative to the names of nodes in a knowledge graph, or other word-recognition/comparison techniques.

If intent-based query resolver 112 identifies a match between an extracted intent from the natural language utterance and a node in the knowledge graph, intent-based query resolver 112 can return a value associated with the matching node as a response to the natural language utterance. In some cases, intent-based query resolver 112 can identify a match between an extracted intent and a node in the knowledge graph based on a match score. If the match score exceeds a threshold value, intent-based query resolver 112 can determine that a match exists between an intent of the natural language utterance and a node in the knowledge graph.

Otherwise, intent-based query resolver 112 can determine that the received natural language utterance is a "long-tail" query and proceed to process the query based on extracting operators and operands from the natural language utterance. Generally, operands included in a natural language utterance may correspond to data nodes in a knowledge graph on which an operation is to be performed, and operators included in a natural language utterance may correspond to a function to be performed on the data from the data nodes in the knowledge graph associated with the operands.

In some cases, intent-based query resolver 112 can determine that the received natural language utterance is a "long-tail" query based on an examination of a response database associated with a chatbot application from which the natural language utterance was received. If the database associated with the chatbot application does not include a response for the long-tail query, intent-based query resolver 112 can proceed to process the query based on extracting operands and operators from the natural language utterance using operand extractor 114 and operator extractor 116, respectively.

In some embodiments, query processor 110 can receive the natural language utterance from a chatbot application. If query processor 110 determines that a response database associated with the chatbot application does not include a response to a query included in the natural language utterance, query processor 110 can proceed to process the natural language response by extracting operands and operators from the natural language utterance. Query processor 110 can determine that the response database associated with the chatbot application does not include a response to the query included in the natural language utterance implicitly (e.g. based on receiving the natural language utterance from the chatbot application for processing) or by querying a database associated with the chatbot application. In some embodiments, intent-based query resolver 112 may use the same models and databases used by a chatbot application to resolve a natural language utterance, and a determination by intent-based query resolver that the query in the received natural language utterance is a "long-tail" query may serve as a determination that no response to the query exists in the response database associated with the chatbot application.

To extract operands from a natural language utterance, operand extractor 114 can generate a similarity score for words or groupings of words to names of nodes in a knowledge graph. Nodes in the knowledge graph may generally represent values input into a knowledge graph or values calculated from data input into the knowledge graph. Operand extractor 114 can tokenize the received natural language utterance (or a text representation of the received natural language utterance, if received as an audio file) into a plurality of tokens for analysis. To determine whether a token (corresponding to a word or group of words in the received natural language utterance) identifies an operand against which an operation is to be performed, operand extractor 114 can generate embedding values for each token relative to the names of each node in the knowledge graph. The embedding values may be generated by operand extractor 114 as a vector having a length corresponding to the number of nodes in the knowledge graph, with each element of in the vector corresponding to a specific node in the knowledge graph. The embedding values may be calculated, for example, as cosine similarity values between a word in the natural language utterance and nodes in the knowledge graph, frequency-based scores between the word in the natural language utterance and nodes in the knowledge graph, match probability scores, or the like.

A natural language model used by operand extractor 114 may be trained using only information from the knowledge graph, such as the names of nodes in the knowledge graph or the like. The natural language model may be trained using, for example, word distance models, word embedding models, or other natural language models that can predict the likelihood that a word matches or otherwise references a specific node in the knowledge graph.

Words that are not likely to correspond to nodes in the knowledge graph may have embedding values closer to a defined minimum value in a range of embedding values, while words that are likely to correspond to nodes in the knowledge graph may have embedding values closer to a defined maximum value in the range of embedding values. To determine whether a token corresponding to a word or series of words is likely to correspond to a node in the knowledge graph (and thus, to an operand on which an operation is to be performed), operand extractor 114 can determine whether an embedding value for a token and the name of a node in the knowledge graph exceeds a threshold value. If none of the embedding values in the vector generated for a token by operand extractor 114 exceed a threshold value, operand extractor 114 can determine that the word in the natural language utterance represented by the token does not represent an operand on which an operation is to be performed.

If at least one embedding value in the vector generated for a token exceeds the threshold value, operand extractor 114 can determine that the word in the natural language utterance represented by the token corresponds to an operand on which an operation is to be performed. Operand extractor 114 can extract a value associated with the node having an embedding value exceeding a threshold value, associate the word or series of words in the natural language utterance represented by the token with the extracted value, and identify the word-value pairing as an operand against which an operation is to be performed. If there are multiple nodes with embedding values that exceed a threshold value, operand extractor 114 can perform further processing to identify the node in the knowledge graph that is most likely to be an operand on which an operation is to be performed. For example, if multiple nodes have embedding values that are above a threshold value and within an amount from each other, operand extractor 114 can use other contextual information to identify a specific node in the knowledge graph to be deemed an operand. For example, operand extractor 114 can examine embedding values for different groups of consecutive words including the word on which the previous embedding values was generated (e.g., the word and an immediately preceding word, the word and an immediately succeeding word, and the like) using the techniques discussed above.

In some embodiments, for nodes associated with numerical values, operand extractor 114 can determine that a word in the natural language utterance corresponds to multiple nodes in the knowledge graph by performing mathematical operations with respect to embedding values generated for a word in the natural language utterance. For example, if a mean (average) word embedding value for a token (e.g., a word or series of words) in the natural language utterance is close in value to a sum of embedding values for a plurality of other graph nodes, operand extractor 114 can determine that an operand corresponds to a sum of values associated with the plurality of other graph nodes.

Operator extractor 116 can execute sequentially or in parallel with operand extractor 114 to identify one or more operations to be performed with respect to the extracted operands in the natural language utterance. To identify the one or more operations included in the natural language utterance, operator extractor 116 can use a predefined mapping of words to various mathematical operations (e.g., stored in operation mapping repository 130) to identify operations to perform in response to a received natural language utterance. These mathematical operations may include addition operations (i.e., to add values associated with multiple nodes), subtraction operations (i.e., to determine a difference between values associated with multiple nodes), multiplication operations (i.e., to generate a product of values associated with multiple nodes), division operations (i.e., to determine a quotient from values associated with multiple nodes), comparison operations, and the like. For example, the mappings of words to mathematical operations may be defined based on Table 1 below:

TABLE 1

Word to Operation Mappings

| Operation | Mapped Words |
| --- | --- |
| Addition | Sum, total, addition, add, plus |
| Subtraction | Difference, decrease, deduct, subtract |
| Multiplication | Product, multiply |
| Division | Divide, percent |
| Equality | Equal, same, identical |
| Greater than | Greater, exceeds, more than, larger than |
| Less than | Fewer, less than, smaller than |
| Union of sets | Together, group |
| Intersection of sets | Common to, member of both |
| Set difference | Member of only one, in A but not in B |
| Set complement | Not included in, not a member of |

In some embodiments, operator extractor 116 can use various natural language processing techniques, such as word embeddings, to determine whether a word in a natural language utterance corresponds to a predefined operation. For example, each operation (e.g., addition, subtraction, multiplication, division, comparison operations, etc.) may be associated with various words that indicate that the operation is to be performed on identified data in the natural language utterance. Each operation may thus be treated as a vector over which natural language processing operations can be performed to determine whether a word in the natural language utterance implicates the operation.

For example, embeddings can be generated for a token (e.g., word or series of words) to determine whether a word in the natural language utterance indicates that an operation is to be performed. A word in the natural language utterance that does not correspond to any of the words mapped to operations may thus result in the generation of a vector having embedding values below a threshold value for each word associated with the operations. In contrast, a word in the natural language utterance that corresponds to one or more of the words mapped to an operation may result in the generation of a vector having at least one embedding value above the threshold value. For example, assume that a received natural language utterance takes the form of "What percent of X is Y." The word percent may imply a division operation on data specified in the natural language utterance. Thus, at least one embedding value for the division operation may be a value over a threshold value and indicate that a division operation is to be performed, and embedding values for words associated with the other operations may be below the threshold value.

In some cases, after identifying operators in the natural language utterance, operand extractor 114 can determine relationships between the operands in the natural language utterance to determine how an operation is to be performed. These relationships may be identified for operations that are sensitive to the order in which operands are input into the operation. For example, these relationships need not be identified where an ordering is irrelevant, such as addition or multiplication operations where $A+B=B+A$ or $A*B=B*A$. However where ordering affects the value generated by an operation, operand extractor 114 can map different operands to specific positions in an equation. For example, in a subtraction operation, operand extractor 114 can identify a minuend (the value from which other values are to be subtracted) and one or more subtrahends (the values that are to be subtracted from the minuend) based on contextual information in the natural language utterance (e.g., an ordering in which operands are specified in the natural language utterance). In another example, in a division operation, operand extractor 114 can identify the dividend and the divisor based on contextual information in the natural language utterance.

Query result generator 118 generally uses the extracted operands and operators to generate a result of the natural language query input by a user into query processor 110. To do so, query result generator 118 performs one or more calculations defined by the extracted operators on the values associated with the extracted operands. As discussed, the extracted operators may be associated with an ordering in which operands are to be acted upon or an identity within a given operation that each operand assumes. Query result generator 118 can thus perform the one or more operations according to the order in which operands are to be acted upon to generate a result of an operation. In some embodiments, where a natural language utterance includes multiple operations, query result generator 118 can determine whether the results of one operation are an operand to another operation. If so, query result generator 118 can order the execution of operations so that intermediate operations whose results are operands to a higher-level operation are performed before these higher-level operations are performed.

After query result generator 118 performs the one or more operations specified in the natural language utterance, query result generator 118 can output the results of the one or more operations to an application for display to a user of the application. In some embodiments, query result generator 118 can output the results as a natural language response to a natural language utterance. The natural language response may, for example, include the requested information as well as the data associated with the extracted operands. In some embodiments, the natural language response may further include information about how the result was generated. A level of detail included in the natural language response may be modified, for example, using one or more verbosity flags in a configuration message or in a request transmitted to the query processor 110. A verbosity flag specifying a lower level of verbosity in the natural language response may include the calculated results of the operation(s) specified in the natural language utterance, while a verbosity flag specifying a higher level of verbosity may include the calculated results of the operation(s) specified in the natural language utterance, the raw data from which the results were calculated, and an explanation of how the results were generated. Additional information in the natural language response may be extracted from a knowledge graph that identifies how the values of the operands was calculated or other relevant information.

By extracting operators and operands from a natural language utterance, query processor 110 can generate an answer to rarely encountered questions for which intent-based query resolver is unable to generate an answer. For any given calculation to be performed on data associated with nodes in the knowledge graph, the calculation can be performed based on the extracted operators and operands rather than relying on an operation defined in a knowledge graph. Thus, chatbots or other support agents may be made more scalable, as various operations not defined in the knowledge graph may be answered by identifying an operation to perform on specified data in the knowledge graph.

Figure 2:
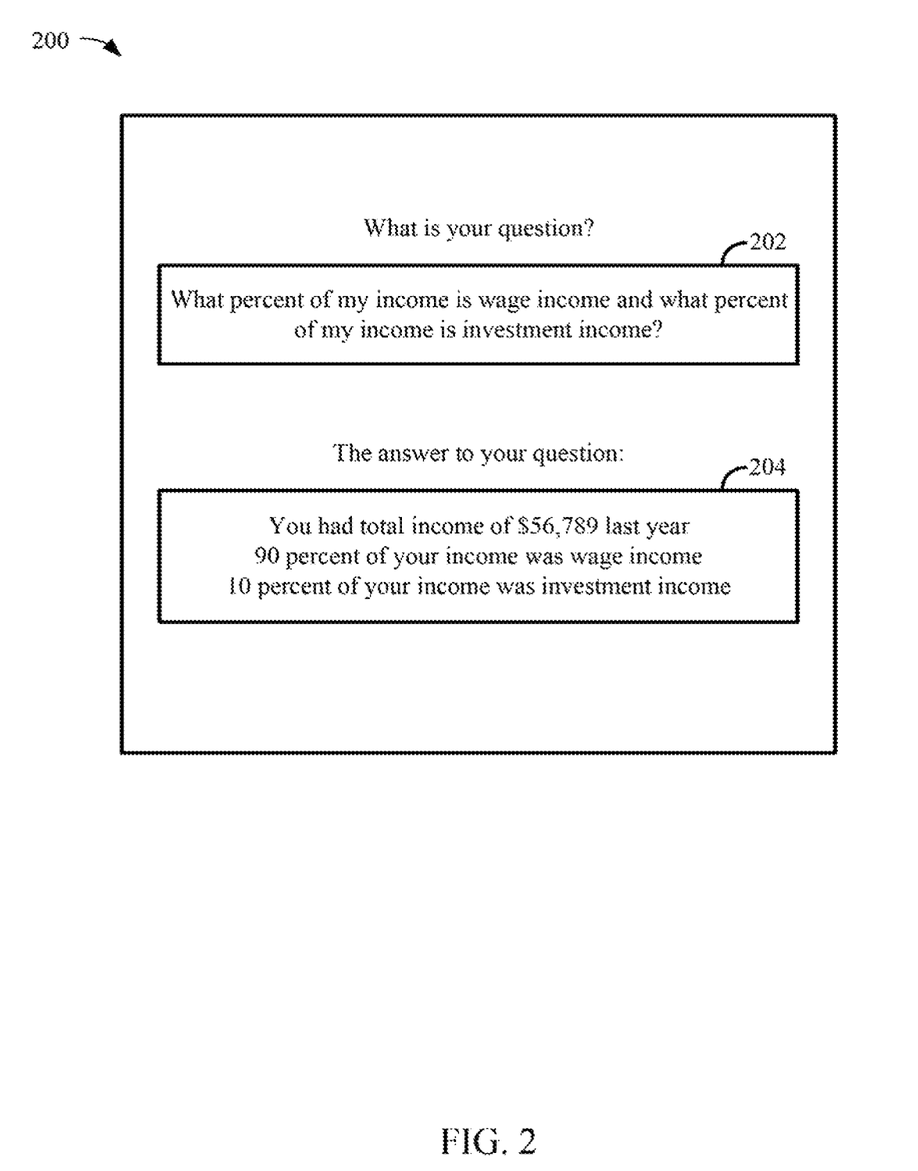
FIG. 2 illustrates an example user interface in which a natural language utterance is provided to a conversational agent and answered by extracting operators and operands from the natural language utterance.

Example User Interface for Generating a Response to a Query in a Natural Language Utterance by Extracting Operators and Operands from the Natural Language Utterance FIG. 2 illustrates an example user interface 200 in which a query posed through a conversational user interface is answered by extracting operators and operands from a natural language utterance.

As illustrated, user interface 200 includes a first field for entering a natural language utterance 202 and a second field for display a result 204 calculated by extracting operators and operands from the natural language utterance 202. While natural language utterance 202 is illustrated as a text string, it should be recognized that the first field for entering the natural language utterance 202 may alternatively or additionally allow for a natural language utterance to be input into user interface 202 as an audio file. Where the first field allows for entry of a natural language utterance as an audio file or live audio stream, the audio file live audio stream may be transcribed into a textual string displayed in user the first field.

In this example, the natural language utterance 202 is "What percent of my income is wage income and what percent of my income is investment income?" To process natural language utterance 202 and generate the result 204, a query processor (e.g., query processor 110 illustrated in FIG. 1) can first attempt to map the natural language utterance to a node in a knowledge graph containing an answer to the query in the natural language utterance 202. If no node exists in the knowledge graph that maps to an intent of the natural language utterance, then the query processor proceeds to attempt to answer the query by extracting operators and operands from the natural language utterance based on mappings between words and operations and words and nodes in the knowledge graph, as discussed above.

Based on extracting operators and operands from the natural language utterance, a query processor can perform one or more operations on data associated with nodes in a knowledge graph (e.g., numerical data calculated based on rules in a knowledge graph or elsewhere defining relationships between nodes in the knowledge graph representing different pieces of data used by an application to perform one or more operations). These operations may be output in result 204, which may include the calculated result and, in some cases, additional detail illustrating how the result was generated, information about the data used to generate result 204, and the like.

Figure 3:
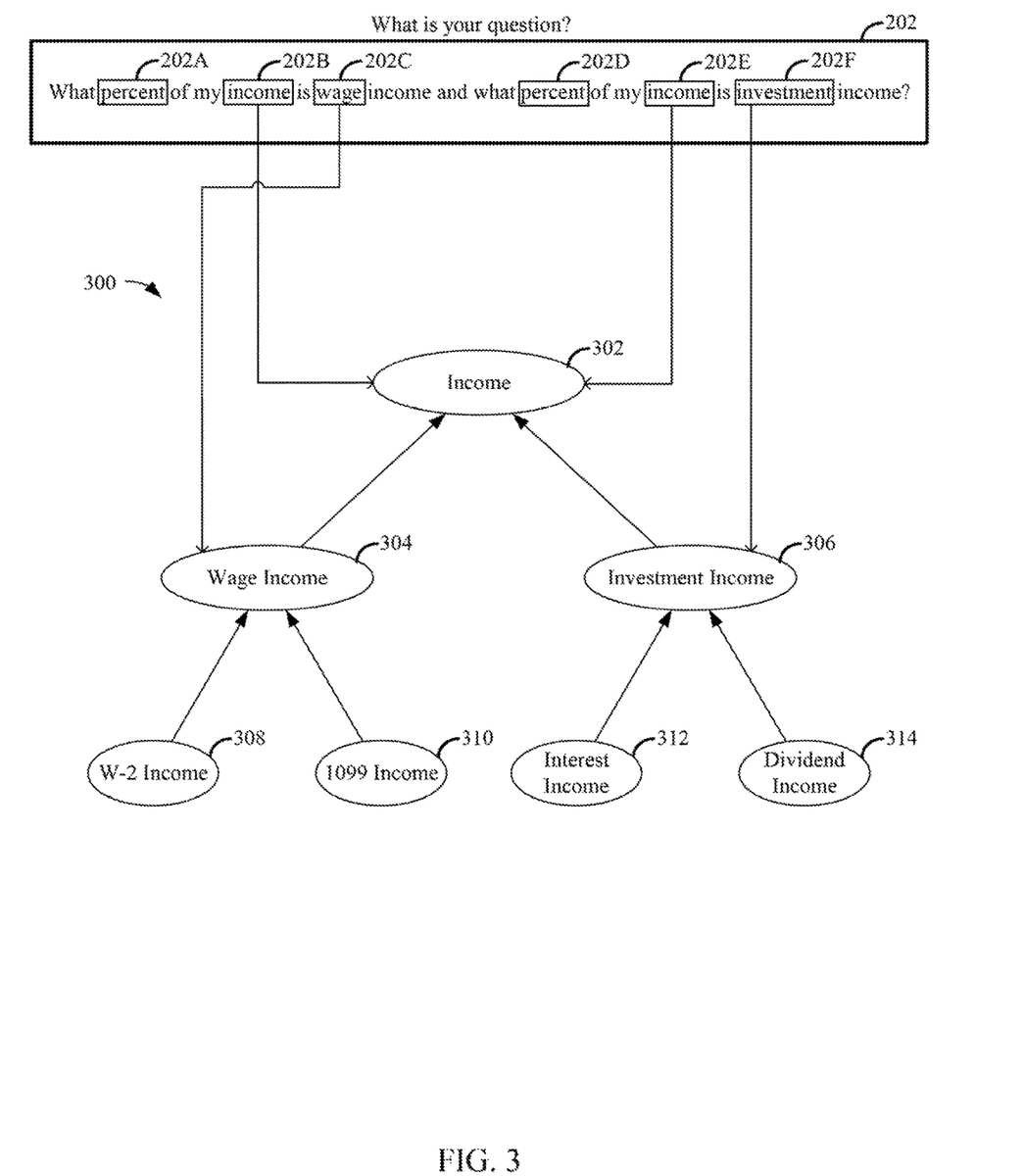
FIG. 3 illustrates an example mapping of operands in a natural language utterance to nodes in a knowledge graph.

Example Identification of Operators and Operands in a Natural Language Utterance FIG. 3 illustrates an example identification of operators and operands in a natural language utterance (e.g., natural language utterance 202 illustrated in FIG. 2) to generate an answer to a "long-tail" query.

To identify operators and operands in natural language utterance 202, a query processor (e.g., 110 in FIG. 1) can tokenize the natural language utterance 202 to isolate individual words or sequences of words in the natural language utterance 202 for analysis.

For example, natural language utterance 202 can be initially deconstructed into tokens of individual words. To identify operators in the received natural language utterance, the query processor can generate embedding values for each token against predefined sets of words associated with different operations. In this example, tokens 202A and 202D may be mapped to a division operation, as the word "percent" (or a permutation of the word "percent") may be included in a set of words associated with a division operation. That is, the word "percent" may result in the generation of embedding values that are below a threshold value for words associated with addition, subtraction, multiplication, and comparison operations, but may result in the generation of an embedding value for at least one word associated with a division operation.

To identify operands on which the extracted operations (represented by tokens 202A and 202D) are to be executed, the query processor can generate a vector including embedding values for each token relative to the names of nodes in a knowledge graph 300 to identify nodes that are related to relevant data to be used in performing one or more operations in the natural language utterance.

Knowledge graph 300, as illustrated, defines nodes corresponding to inputs that can be used to calculate total income. In this example, the value of income node 302 represents a total income calculated as a sum of the value of wage income node 304 and the value of investment income node 306. In turn, the value of wage income node 304 may be represented as the sum of the value of the W-2 income node 308 and 1099 income node 310. The value of investment income node 306 may be represented as a sum of the interest income node 312 and the dividend income node 314. Knowledge graph 300 may be organized into a vector including the names of each of income node 302, wage income node 304, investment income node 306, W-2 income node 308, 1099 income node 310, interest income node 312, and dividend income node 314. The vector need not maintain information about the specific structure of the knowledge graph (e.g., relationships between nodes), but may maintain a list of nodes in the knowledge graph, as the vector is used to identify which nodes in the knowledge graph are associated with data used by an operation identified in a natural language utterance.

In some embodiments, elements in the vector representing knowledge graph 300 may also include other information describing the data represented by a node in the knowledge graph that can be used to determine whether a token in the natural language utterance corresponds an operand represented by a node in the knowledge graph.

In this example, tokens 202B ("income"), 202C ("wage"), 202E ("income"), and 202F ("investment") may map to nodes in the knowledge graph. That is, for tokens 202B and 202E, an embedding value in a vector of embedding values including embedding values for each node in the knowledge graph 300 may have a value that exceeds a threshold value for income node 302 and embedding values that do not exceed the threshold value for wage income node 304, investment income node 306, W-2 income node 308, 1099 income node 310, interest income node 312, and dividend income node 314.

For token 202C, an embedding value in a vector generated over the nodes in the knowledge graph 300 may have a value that exceeds a threshold value for wage income node 304 and embedding values that do not exceed the threshold value for income node 302, investment income node 306, W-2 income node 308, 1099 income node 310, interest income node 312, and dividend income node 314.

Finally, for token 202F, an embedding value in a vector generated over the nodes in the knowledge graph 300 may have a value that exceeds a threshold value for investment income node 306 and embedding values that do not exceed the threshold value for income node 302, wage income node 304, W-2 income node 308, 1099 income node 310, interest income node 312, and dividend income node 314. Based on these embedding values and identification of nodes associated with tokens in the natural language utterance 202, a query processor can retrieve the values associated with nodes 302, 304, and 306 for use in performing the operations identified by tokens 202A and 202D.

Semantic information about the ordering of words in the natural language utterance can be used to determine specific roles in an operation that each operand performs. A natural language understanding model can be trained with various sentences or phrases that indicate, for certain operations, relationships between words in a natural language utterance. In this example, the natural language understanding model may be trained to recognize that the phrase "percent of X is Y" specifies that X serves as the divisor in a division operation and Y serves as the dividend in the division operation. Thus, in natural language utterance 202, the query processor can determine that token 202B corresponds to the divisor and token 202C corresponds to the dividend in a division operation identified by token 202A, such that a percentage of income that is wage income is represented by the equation:

$$\frac{\text{wage income}}{\text{total income}}.$$

Likewise, me query processor can determine that token 202E corresponds to the divisor and token 202F corresponds to the dividend in a division operation identified by token 202D, such that a percentage of income that is investment income is represented by the equation:

$$\frac{\text{investment income}}{\text{total income}}.$$

In some embodiments, the query processor can further use information in the knowledge graph 300 to provide additional information to the user of the software application in response to receiving the query in natural language utterance 202. For example, the query processor can use relationships showing the child nodes of a given node to provide an explanation of how values of operands used in an operation were generated or to otherwise provide more granular detail about the value(s) generated by performing the operation(s) specified in the natural language utterance 202.

Figure 4:
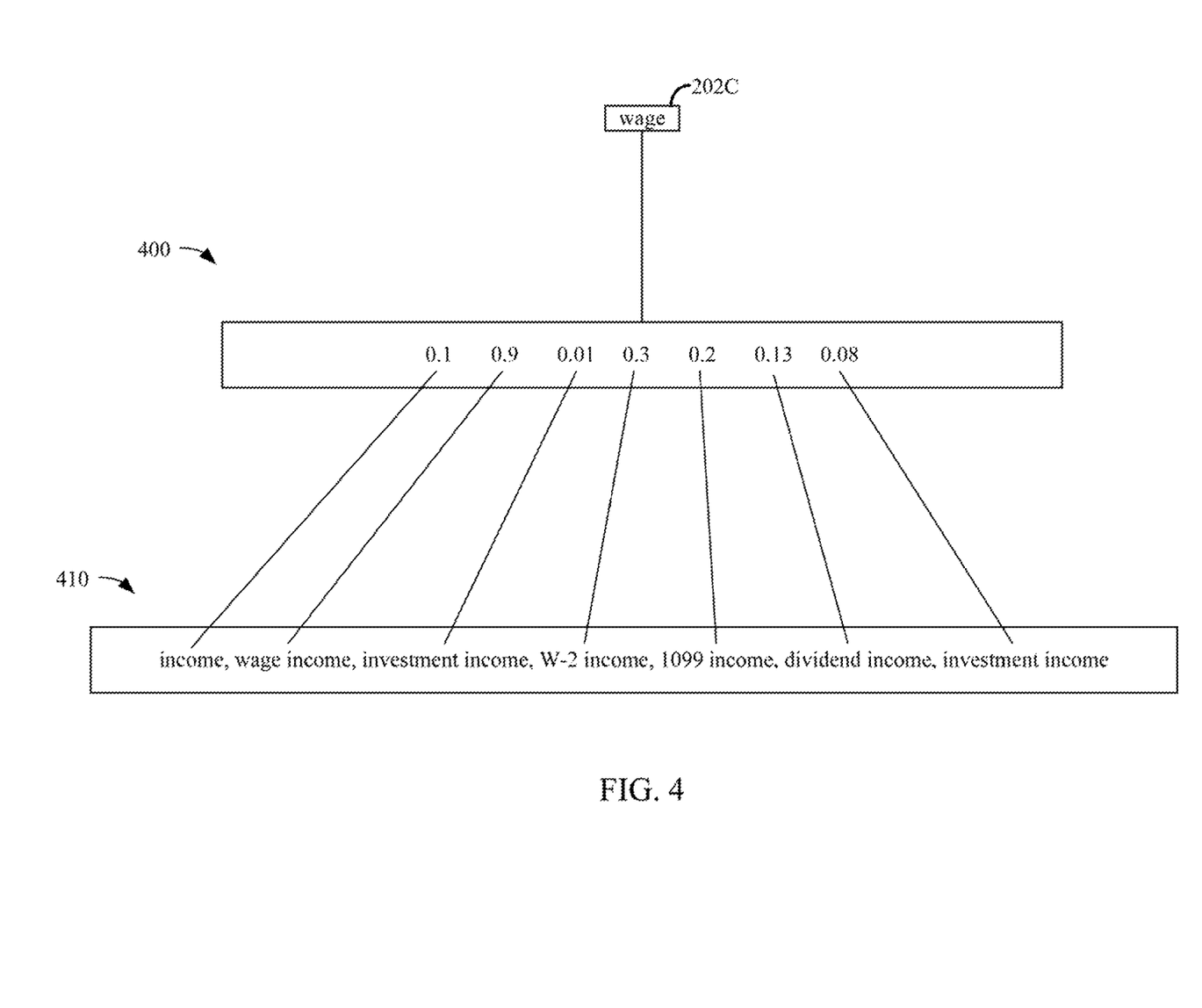
FIG. 4 illustrates an example vector of embedding values generated for a token in a natural language utterance.

FIG. 4 illustrates an example mapping of a token (word) in a natural language utterance to a vector of embedding values for nodes in a knowledge graph.

As illustrated, token 202C represents the word "wage" for which a vector of embedding values 400 is generated. Each embedding value in the vector 400 may be mapped to the names of nodes in the knowledge graph, illustrated by node vector 410. That is, the first embedding value in vector 400 may be associated with the "income" node, the second embedding value in vector 400 may be associated with the "wage income" node, the third embedding value in vector 400 may be associated with the "investment income" node, the fourth embedding value in vector 400 may be associated with the "W-2 income" node, the fifth embedding value in vector 400 may be associated with the "1099 income" node, the sixth embedding value in vector 400 may be associated with the "dividend income" node, and the seventh embedding value in vector 400 may be associated with the "investment income" node.

As illustrated, an embedding value, representing a similarity between token 202C and the names of knowledge graph nodes in vector 410, may be generated for each node in the knowledge graph. In this example, the token "wage" may have a highest embedding values for the "wage income" node and may have embedding values that are much smaller for each of the other nodes in the knowledge graph. Thus, the query processor can determine that the token 202C maps to the wage income node in the knowledge graph and identify the word "wage" in token 202C as an operand on which a specified operation is to be performed.

Figure 5:
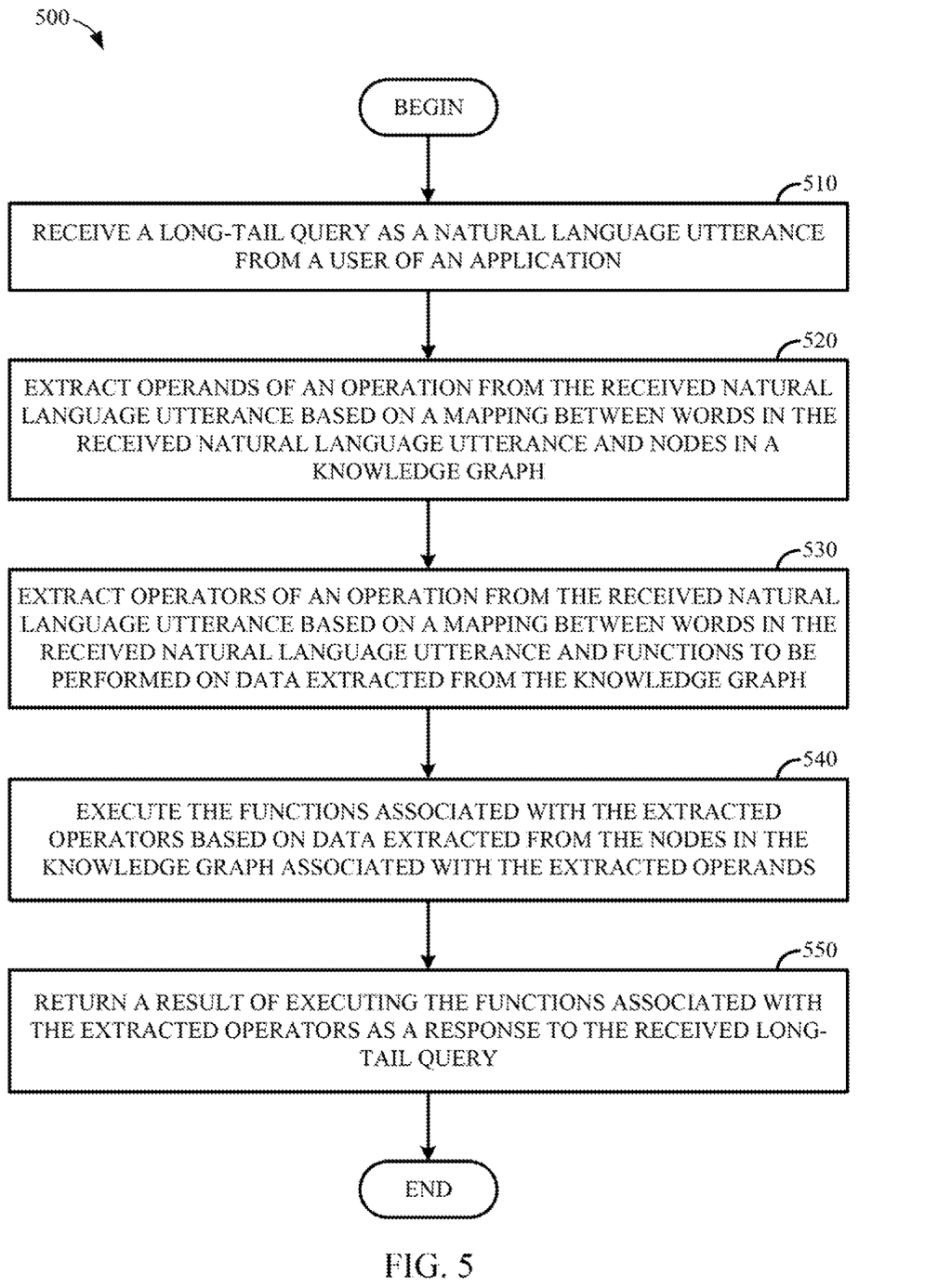
FIG. 5 illustrates example operations for processing a natural language utterance including a question against a knowledge graph by extracting operators and operands from the natural language utterance.

Example Computer-Implemented Method for Generating a Response to a Query in a Natural Language Utterance by Extracting Operators and Operands from the Natural Language Utterance FIG. 5 illustrates example operations 500 for generating a response to a "long-tail" query based on operators and operands extracted from a natural language utterance. The operations described herein may be performed by a natural language query processor (e.g., query processor 110 illustrated in FIG. 1) or on a computing device on which an application and a query processor used by the application are deployed.

As illustrated, operations 500 begin at block 510, where a system receives a long-tail query as a natural language utterance from a user of an application. The "long-tail" query may be received, in some cases, from a chatbot application. As discussed, a "long-tail" query generally represents a query for which an intent-based query resolver is unable to generate an answer (e.g., due to the rarity of such a question being asked and a lack of an exact mapping between an intent of a query to a node in a knowledge graph). In some cases, to determine that the query received in a natural language utterance is a long-tail query, the system can attempt to extract an intent of the query and match the extracted intent of the query to a node in a knowledge graph. If the system determines that the query cannot be matched to a node in the knowledge graph (e.g., that embedding values for the extracted intent over the names of the nodes in the knowledge graph are below a threshold value or otherwise that no match exists between the extracted intent and a node in the knowledge graph), the system can determine that the query in the natural language utterance is a "long-tail" query, and operations 500 may proceed to block 520.

At block 520, the system extracts operands of an operation from the received natural language utterance. The operands may be extracted from the received natural language utterance based on mappings between words in the received natural language utterance and nodes in a knowledge graph.

In some embodiments, in order to identify and extract operands from the natural language utterance, the system can tokenize the natural language utterance into a plurality of tokens and analyze each token using a natural language model trained using training data obtained from the knowledge graph (e.g., names of nodes in the knowledge graph, relationships between nodes in the knowledge graph, and the like). Generally, tokens (words or sequences of words) that correspond to a node in the knowledge graph, and thus to an operand on which an operation can be performed, may be associated with embedding values, similarity values, or the like that exceed a threshold value, and tokens that do not correspond to any node in the knowledge graph may be associated with embedding values or similarity values that do not exceed the threshold value.

In some embodiments, a natural language model can generate embedding values that exceed the threshold value for multiple nodes in the knowledge graph in a set of potential matches to the token. The threshold value may be defined a priori based on an analysis of threshold values against results of performing inferences on a ground truth data set such that the selected threshold value corresponds to the threshold value that results in maximum accuracy with respect to determining correct mappings between words and operands. In such a case, the system can map a token (and thus, an operand), to a node having the largest embedding value. In some cases, the system can use other contextual information, such as word(s) immediately preceding or following the word represented by a token, to identify a node in the knowledge graph to which the token is to be mapped. For example, in FIG. 3 above, the word "income" might have embedding values that exceed the threshold value for many of the nodes in knowledge graph 300. Thus, the natural language model can select an immediately previous word to generate a token for analysis. For example, the token generated for the word "income" in natural language utterance 202 may be "wage income" or "investment income," which may have embedding values above a threshold value for a specific node in knowledge graph 300 (e.g., to nodes 304 and 306, respectively).

In some embodiments, a system can map a token representing a word in a natural language utterance to multiple nodes in a knowledge graph. To do so, the system can calculate an average word embedding value for an utterance and identify nodes in the knowledge graph associated with embedding values that, when combined, approach the average word embedding value. The average word embedding value may be the average of each of the individual embedding values generated for each word or sequence of words in the natural language utterance. The sum of the values associated with the identified nodes may be determined to be the value of an operand represented by the token.

At block 530, the system extracts operators of an operation from the received natural language utterance. The system can extract operators from the natural language utterance based on a mapping between words in the received natural language utterance and functions to be performed on data extracted from the knowledge graph.

In some embodiments, in order to extract operators from the natural language utterance, the system can tokenize the natural language utterance to generate a plurality of tokens associated with individual words or sequences of words in the natural language utterance. Each token may be compared, using a natural language model, to predefined sets of words mapped to various operations (e.g., addition, subtraction, multiplication, division, comparison, etc.). In some embodiments, the tokens may be compared to these predefined sets of words by generating embedding values for each token over vectors of the words associated with each operation. Generally, when a token does not correspond to an operation, the embedding values for the token over the words associated with the operation may each be a value below a threshold value. Meanwhile, when a token corresponds to an operation, at least one embedding value over the words associated with the operation may be a value above a threshold level.

In some embodiments, the system can identify word-operation pairings in a mapping of words to operations having a word that matches (or substantially matches) the word or words in a token. Based on the identification, the system can identify inputs to the operation specified in the natural language utterance. The operation may be performed a number of times specified in the natural language utterance, and the system can identify a number of iterations of the operation is to be performed and inputs for each iteration of the operation based on a semantic analysis of the received natural language utterance. For example, suppose that the natural language utterance requests the sum of data from n nodes in the knowledge graph. The system can process the natural language utterance as a series of n−1 addition operations, where the results of one addition operation are used as an input into another addition operation.

In some embodiments, the system can identify for an operation, one or more intermediate operations to perform before performing the extracted operation. For example, a system can use information about the operation and contextual information in the natural language utterance to identify operands for the operation. If the system determines that an operand is missing, the system can determine that the result of an intermediate operation is an operand for the operation and orchestrate the execution of various operations to satisfy the request such that the intermediate operation is executed prior to executing the operation. A system can determine that an operand is missing based on an expected number of operands for a given operation. For example, assume that at least two operands are needed to perform an operation. If only one operand is identified in a natural language utterance, the system can determine that the result of another operation represents the other operand needed to perform an operation.

At block 540, the system executes the functions associated with the extracted operators based on data extracted from the nodes in the knowledge graph associated with the extracted operands.

At block 550 the system returns a result of executing the functions associated with the extracted operators as a response to the received long-tail query. In some embodiments, the result may be transmitted to a user through a chatbot application from which the long-tail query was received.

Figure 6:
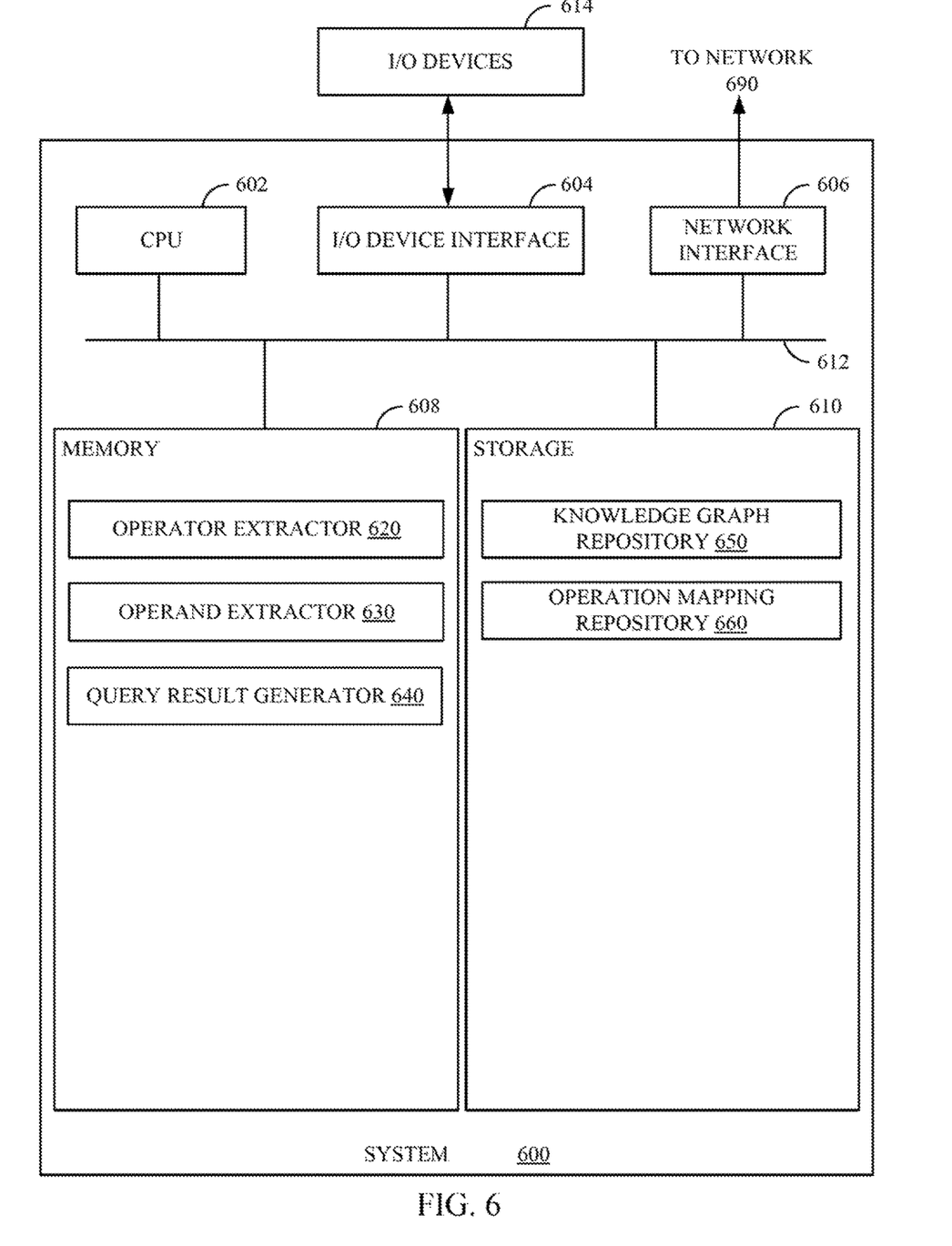
FIG. 6 illustrates an example system on which embodiments of the present disclosure can be performed.

Example System for Generating a Response to a Query in a Natural Language Utterance by Extracting Operators and Operands from the Natural Language Utterance FIG. 6 illustrates an example system 600 configured to perform the methods described herein, including, for example, method 500 of FIG. 5. In some embodiments, system 600 may act as a query processor, such as query processor 110 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, storage 610, and an interconnect 612. The I/O devices 614 and/or network interface 606 may be used to receive a query in a natural language utterance through a chatbot application and output a response to the query generated based on extracting operators and operands from the natural language utterance.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes an operator extractor 620, operand extractor 630, and query result generator 640.

Operator extractor 620 generally parses a received natural language utterance to identify and extract operators in a long-tail query. As discussed, to extract operators from a natural language utterance, operator extractor 620 can tokenize the received natural language utterance to generate a plurality of tokens corresponding to words or sequences of words for analysis. Operator extractor 620 can use mappings of words to operations stored in operation mapping repository 660 to identify words in the received natural language utterance that correspond to operators (and thus, operations to perform on specified data in the received natural language utterance). In some cases, operator extractor 620 can use embedding values generated for each token over the words mapped to each operation to determine whether a token corresponds to an operation and, if so, identify the corresponding operation.

Operand extractor 630 generally parses the received natural language utterance to identify and extract operands in a long-tail query. To extract operands from a received natural language utterance, operand extractor 630 can tokenize the received natural language utterance to generate a plurality of tokens corresponding to words or sequences of words in the natural language utterance. Operand extractor 630 can compare the tokens to information about nodes in a knowledge graph stored in knowledge graph repository 650 to identify tokens corresponding to nodes in the knowledge graph and thus to data used by the operations extracted by operator extractor 620 to generate a result for a received query. Operand extractor 630 can use embedding values over the names of nodes in the knowledge graph to identify operands in the natural language utterance and retrieve values associated with these operands from the knowledge graph for use in generating a response to the long-tail query.

Query result generator 640 generally uses the extracted operands and extracted operators to generate a result for a received long-tail query. The result may be included in a natural language response output by system 600 to a requesting device (e.g., via network interface 606). In some embodiments, the natural language response may include additional information explaining how the result was calculated, information about the operands used to generate the result, and the like.

Storage 610 is representative of a non-volatile memory, such as a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN). Storage 610, as illustrated, may include a knowledge graph repository 650 and an operation mapping repository 660. Knowledge graph repository 650 generally represents a data repository in which knowledge graphs defining functions executed within an application are defined. As discussed, these knowledge graphs may include names or other characteristics that can be used to identify operands in a long-tail query. Operation mapping repository 660 generally represents a data repository in which mappings of words and operations are maintained. These mappings generally identify sets of words that, when included in a natural language utterance, identifies an operation to be performed on operands in the natural language utterance.

In some embodiments, knowledge graph repository 650 and operation mapping repository 560 may be stored in one or more repositories remote from system 600 but connected via a network (e.g., network 690).

While FIG. 6 illustrates an implementation in which a user interacts directly with a system that resolves natural language queries, it should be recognized that one or more servers may interact with system 500 to provide a natural language utterance to system 500 for analysis. For example, these servers may host an application that allows a user to input a query as a natural language utterance, and these servers may provide the natural language utterance to system 500 for resolution. System 500 can generate a response (e.g., by extracting operations and operands from the natural language utterance) and transmit the response back to the application (e.g., via a chatbot application) for display or other provision to a user of the application.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for processing natural language utterances in a knowledge graph, comprising:
receiving a long-tail query comprising a natural language utterance from a user of an application;
extracting, using a natural language model, operands and operators from the natural language utterance, wherein:
operands are mapped to nodes in a knowledge graph defining operations to be performed within a software application, the nodes representing values calculated from data input into the application,
operators are mapped to operations to be performed on data extracted from the knowledge graph, wherein the data corresponds to the operands mapped to the nodes in the knowledge graph, and
extracting operands from the natural language utterance comprises, for each respective word in the natural language utterance:
generating embedding values for each pairing of the respective word and a node in the knowledge graph; and
determining that the respective word is an operand based on determining that a generated embedding value of the generated embedding values exceeds a threshold value;
executing functions associated with the operators using data extracted from the nodes in the knowledge graph associated with the operands to generate a query result; and
returning the query result as a response to the received long-tail query.

2. The method of claim 1, wherein the natural language model is trained using only training data obtained from the knowledge graph.

3. The method of claim 1, further comprising:
identifying a set of nodes corresponding to potential matches to the respective word in the natural language utterance; and
selecting a node of the identified set of nodes with a largest embedding value as an operand corresponding to the respective word in the natural language utterance.

4. The method of claim 1, wherein determining that the respective word is an operand comprises:
calculating an average word embedding value for an utterance;
determining that the calculated average word embedding value is within a threshold amount of a sum of embedding values for a plurality of nodes in the knowledge graph; and
mapping the respective word to a sum of the plurality of nodes in the knowledge graph.

5. The method of claim 1, wherein extracting operators from the natural language utterance comprises, for each respective word in the natural language utterance:
identifying a word-operation pairing in a mapping of words to operations having a matching word to the respective word; and
for the operation included in the identified word-operation pairing, identifying which of the extracted operands represent inputs to the operation specified in the natural language utterance.

6. The method of claim 5, further comprising: identifying, from a semantic analysis of the natural language utterance, a number of iterations of the operation included in the identified word-operation pairing to be performed and inputs for each iteration of the operation.

7. The method of claim 1, further comprising:
identifying, from an extracted operation and extracted operands, one or more intermediate operations to perform before performing the extracted operation; and
executing the one or more intermediate operations.

8. The method of claim 1, wherein:
the long-tail query is received via a chatbot application, and
the response is transmitted to the user via the chatbot application.

9. The method of claim 8, further comprising: determining that a response database associated with the chatbot application does not include a response for the long-tail query.

10. The method of claim 1, wherein extracting operands from the natural language utterance further comprises:
determining that multiple nodes are associated with embedding values for the respective word above the threshold value; and
extracting operands as groups of words from the natural language utterance based on an aggregate embedding value for each respective group of words in the natural language utterance including the respective word.

11. A system, comprising:
a processor; and
a memory having instructions stored thereon which, when executed by the processor, performs an operation for processing natural language utterances in a knowledge graph, the operation comprising:
receiving a long-tail query comprising a natural language utterance from a user of an application;
extracting, using a natural language model, operands and operators from the natural language utterance, wherein:
operands are mapped to nodes in a knowledge graph defining operations to be performed within a software application, the nodes representing values calculated from data input into the application,
operators are mapped to operations to be performed on data extracted from the knowledge graph, wherein the data corresponds to the operands mapped to the nodes in the knowledge graph, and
extracting operands from the natural language utterance comprises, for each respective word in the natural language utterance:
generating embedding values for each pairing of the respective word and a node in the knowledge graph; and
determining that the respective word is an operand based on determining that a generated embedding value of the generated embedding values exceeds a threshold value;
executing functions associated with the operators using data extracted from the nodes in the knowledge graph associated with the operands to generate a query result;
and
returning the query result as a response to the received long-tail query.

12. The system of claim 11, further comprising:
identifying a set of nodes corresponding to potential matches to the respective word in the natural language utterance; and
selecting a node of the identified set of nodes with a largest embedding value as an operand corresponding to the respective word in the natural language utterance.

13. The system of claim 11, wherein determining that the respective word is an operand comprises:
calculating an average word embedding value for an utterance;
determining that the calculated average word embedding value is within a threshold amount of a sum of embedding values for a plurality of nodes in the knowledge graph; and
mapping the respective word to a sum of the plurality of nodes in the knowledge graph.

14. The system of claim 11, wherein extracting operators from the natural language utterance comprises, for each respective word in the natural language utterance:
identifying a word-operation pairings in a mapping of words to operations having a matching word to the respective word; and
for the operation included in the identified word-operation pairing, identifying which of the extracted operands represent inputs to the operation specified in the natural language utterance.

15. The system of claim 14, wherein the operation further comprises: identifying, from a semantic analysis of the natural language utterance, a number of iterations of the operation included in the identified word-operation pairing to be performed and inputs for each iteration of the operation.

16. The system of claim 11, wherein the operation further comprises:
identifying, from an extracted operation and extracted operands, one or more intermediate operations to perform before performing the extracted operation; and
executing the one or more intermediate operations.

17. The system of claim 11, wherein:
the long-tail query is received via a chatbot application, and
the response is transmitted to the user via the chatbot application.

18. The system of claim 17, wherein the operation further comprises: determining that a response database associated with the chatbot application does not include a response for the long-tail query.

19. A method for processing natural language utterances in a knowledge graph, comprising:
receiving a natural language utterance from a user of an application;
extracting an intent from the natural language utterance;
determining that no match exists between the extracted intent and nodes in a knowledge graph defining operations to be performed within the application; and
based on the determining that no match exists between the extracted intent and the nodes in the knowledge graph:
extracting, using a natural language model, operands and operators from the natural language utterance, wherein:
operands are mapped to nodes in a knowledge graph, the nodes representing values calculated from data input into the application,
operators are mapped to operations to be performed on data extracted from the knowledge graph, wherein the data corresponds to the operands mapped to the nodes in the knowledge graph, and
extracting operands from the natural language utterance comprises, for each respective word in the natural language utterance:
generating embedding values for each pairing of the respective word and a node in the knowledge graph; and
determining that the respective word is an operand based on determining that a generated embedding value of the generated embedding values exceeds a threshold value;

executing functions associated with the operators using data extracted from the nodes in the knowledge graph associated with the operands to generate a query result; and
returning the query result as a response to the received natural language utterance.

\* \* \* \* \*